Aug. 18, 1953  D. E. DASHER  2,648,952
ROTARY PUMP AND MOTOR HYDRAULIC TRANSMISSION
Filed Feb. 14, 1948  4 Sheets-Sheet 1
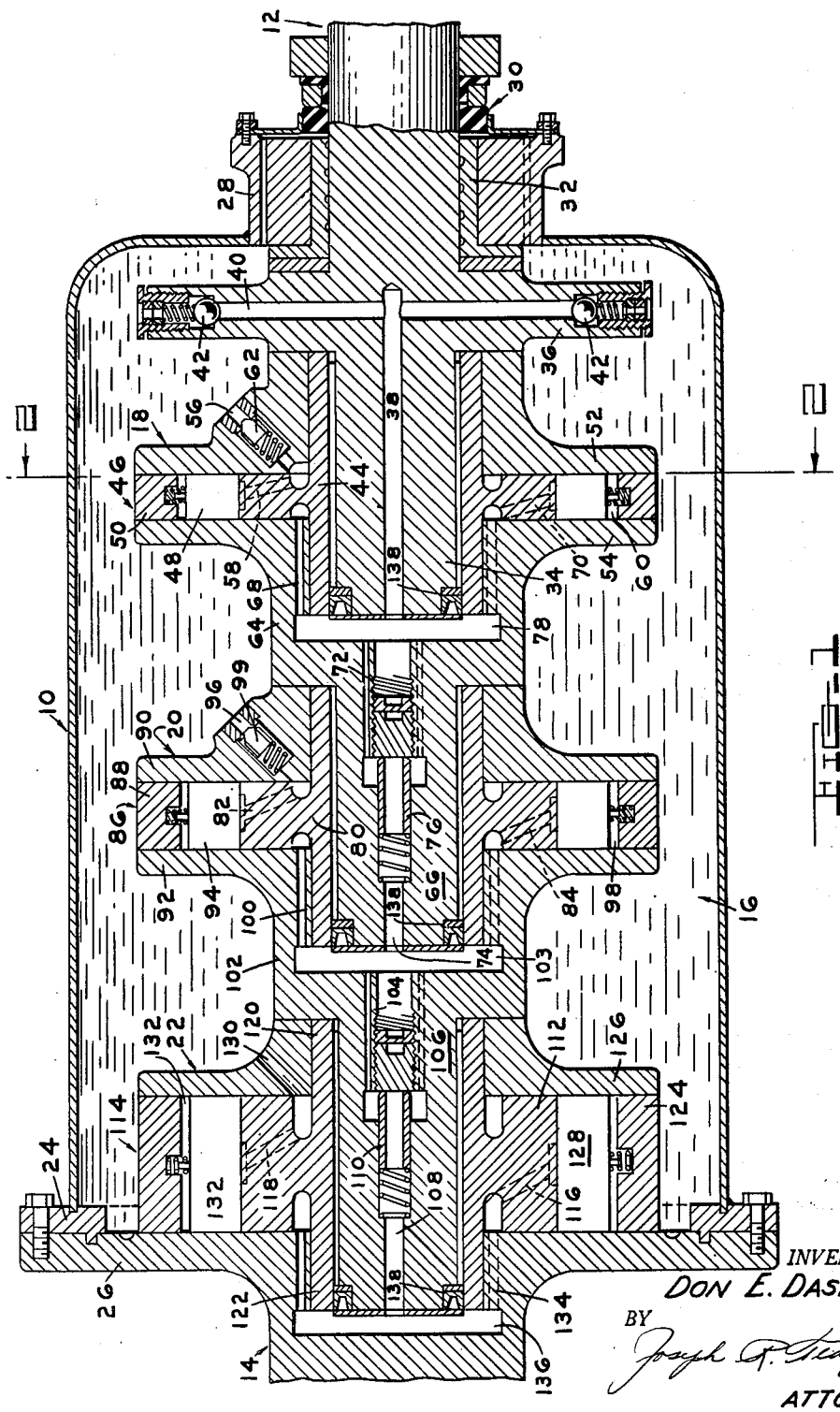
INVENTOR.
DON E. DASHER
BY
ATTORNEY

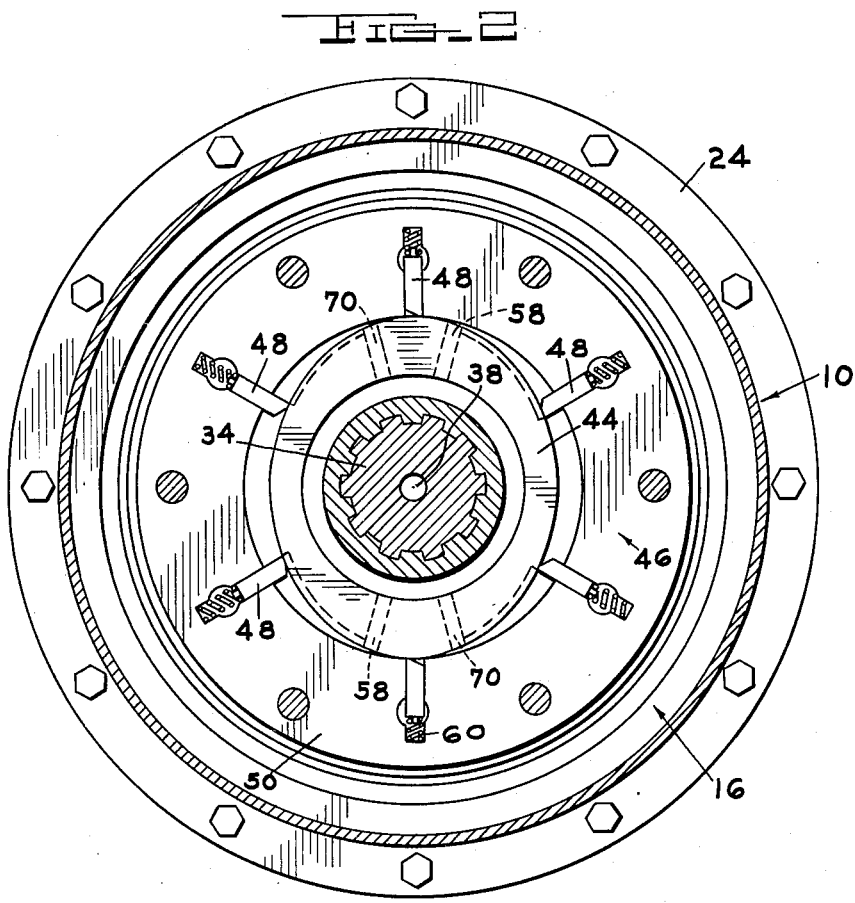

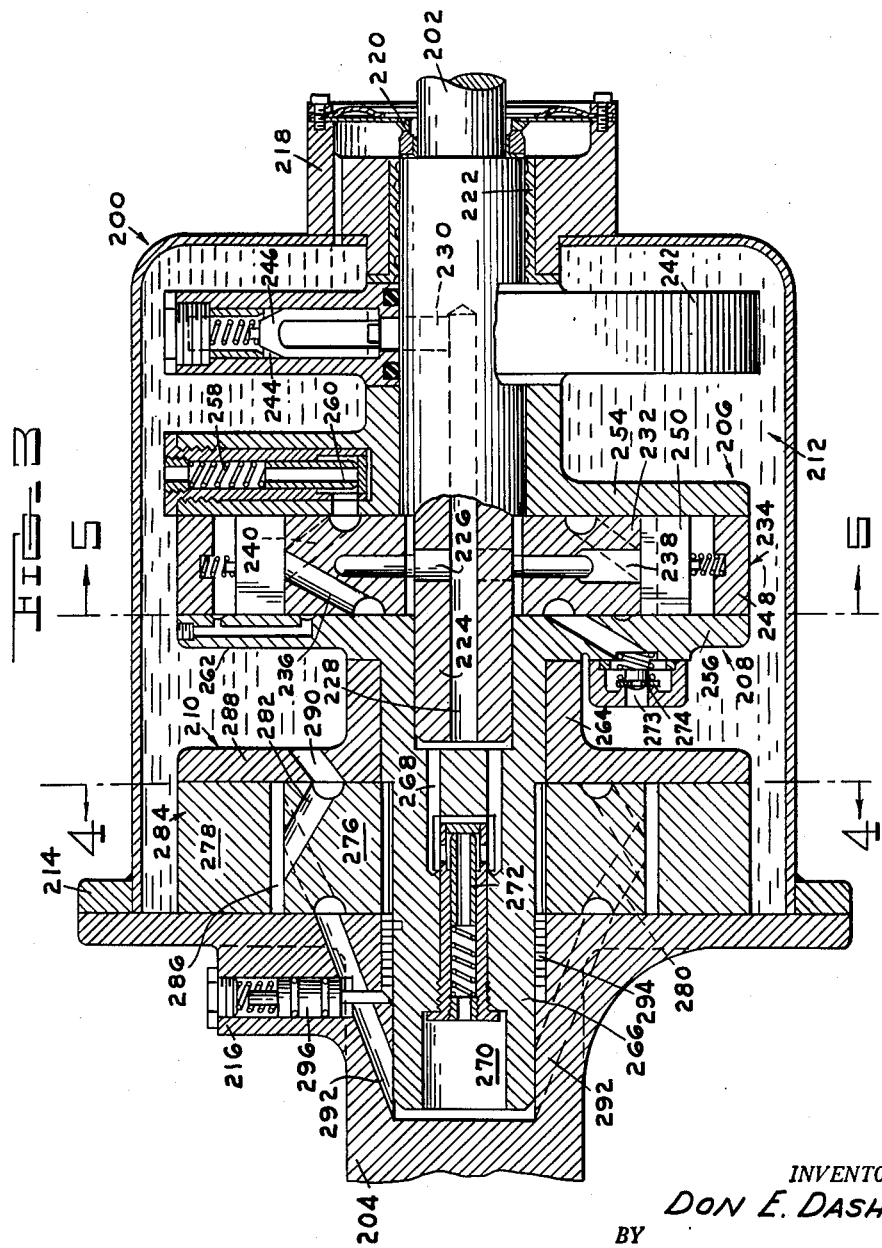

Aug. 18, 1953  D. E. DASHER  2,648,952
ROTARY PUMP AND MOTOR HYDRAULIC TRANSMISSION
Filed Feb. 14, 1948  4 Sheets-Sheet 4
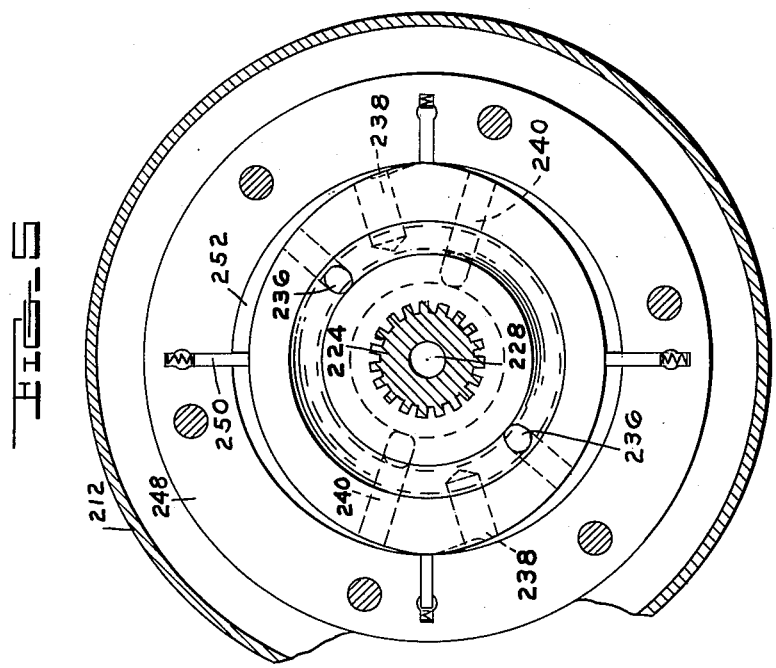
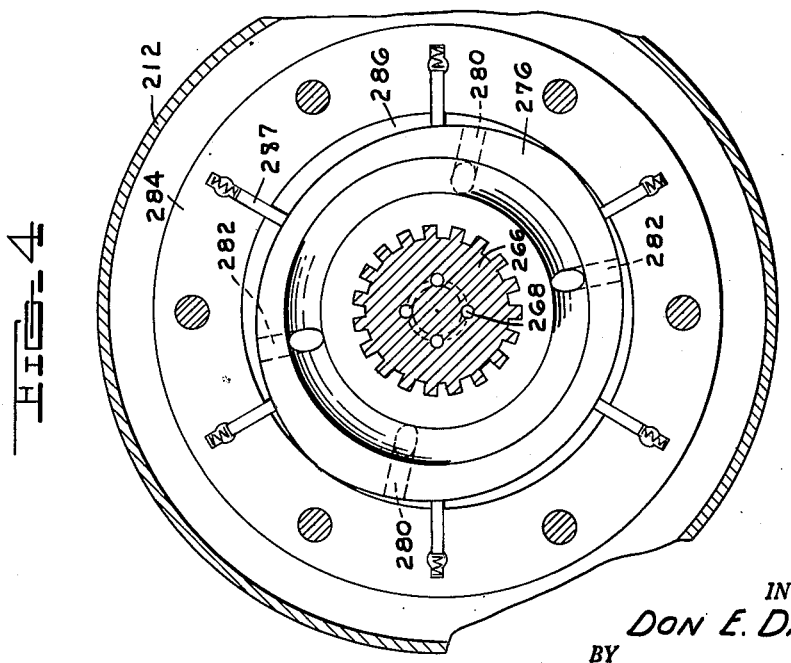
INVENTOR.
DON E. DASHER
BY
*Joseph G. Fragna*
ATTORNEY Patented Aug. 18, 1953

2,648,952

UNITED STATES PATENT OFFICE 2,648,952

ROTARY PUMP AND MOTOR HYDRAULIC TRANSMISSION

Don E. Dasher, Birmingham, Mich.

Application February 14, 1948, Serial No. 8,329

9 Claims. (Cl. 60—53)

This invention relates to automatic transmissions and more particularly to automatic variable ratio hydraulic transmissions.

Broadly the invention comprehends the provision of an automatic hydraulic transmission comprising one or more fluid pumps and a fluid motor driven thereby effective in the automatically controlled operation thereof to produce different driving ratios between the input and output shafts of the transmission.

An object of the invention is the provision of a fluid pump-motor hydraulic transmission that is simple of construction and effective in operation.

Another object of the invention is the provision of a fluid pump-motor power transmitting mechanism having automatic control means therefor for producing a variable ratio output.

Another object of the invention is the provision of a pair of fluid pumps and a fluid motor driven thereby having automatically pressure responsive control means therefor for effecting automatic lock up between the pumps and the pumps and motor for a variable output of the transmission in accordance with torque demand of the output member thereof.

A further object of the invention is the provision of an automatic variable speed ratio transmission comprising one or more fluid pumps and a motor driven thereby wherein the fluid seals therefor are subject solely to low pressures thereby minimizing the chances of loss of fluid from the transmission.

A yet further object of the invention is the provision of an automatic hydraulic transmission comprising a pair of different capacity fluid pumps and a fluid motor alternately driven by the pumps effective to produce correspondingly different driving ratios at the output of the transmission.

A still further object of the invention is the provision of an automatic variable speed ratio hydraulic power transmission having incorporated between the input and output members thereof a fluid pump-motor unit capable of smoothly and effectively varying the speed of the output member in accordance with torque demand placed thereon.

Other objects and advantages of the invention will appear from the following description taken in connection with the drawings forming a part of the specification, and in which:

Fig. 1 is a longitudinal cross-sectional view of a hydraulic transmission;

Fig. 2 is a cross-sectional view taken substantially along lines 2—2 of Fig. 1;

Fig. 3 is a longitudinal cross-sectional view of a modified form of the transmission shown by Fig. 1;

Fig. 4 is a cross-sectional view taken substantially along lines 4—4 of Fig. 3; and Fig. 5 is a cross-sectional view taken substantially along lines 5—5 of Fig. 3.

The present invention aims to provide an automatic variable ratio hydraulic transmission of the fluid pump-motor type characterized in that it has a simple and compact structure and is highly efficient in operation.

The instant structure comprises, as the core of the power transmitting mechanism adapted to be interposed between a power driven input member and a power output member of the transmission, one or more fluid pumps and a motor driven thereby having appropriate fluid pressure responsive means associated therewith for the integrated variable ratio output of the transmission in accordance with torque placed upon the output member of the transmission.

In instances where more than one pump is employed, they are made of different capacities to one another and to the motor so as to effect different driving ratios between the input and output members of the transmission as predetermined by the proportioning of the pumps and motor, respectively to one another.

The pumps and motor are arranged together with hydraulic fluid supply therefor within a completely filled hydraulic fluid containing housing. The pumps are so controlled relative to their discharge pressures as to be alternately operable for the delivery of fluid under pressure to the motor thereby effecting a variable ratio output between the input and output members of the transmission.

As the speed ratio of the transmission varies from a predetermined maximum to approximately a 1 to 1 drive, the pumps are automatically fluid pressure responsive locked-up relative to one another and subsequently to the motor when a 1 to 1 or direct drive is established between the input and output members of the transmission.

Because of the arrangement of the fluid pressure delivery between the pumps and motor within the fluid reservoir housing, the fluid seals for the transmission are subjected solely to low fluid pressures during the variable ratio stages of operation of the transmission and are neither subject to wear or fluid pressure at direct driving conditions because no relative motion takes place between the input and output members of the transmission and no fluid flow occurs between the pumps and motor.

The pumps and motor are each of the balanced type so as to effect an equal bearing distribution for the operation of the transmission especially under locked-up operating condition of the pumps and motor.

It is possible through modification of the pump structure by the provision of additional outlet pressure control means therefor to eliminate one or more pumps from a two or more pump system without materially sacrificing the automatic controllability and efficiency of the transmission.

Referring to the drawings for more specific details of the invention 10 represents generally a hydraulic power transmission comprising a power driven input member or shaft 12, a power output shaft 14 for the transmission, a fluid reservoir housing 16, a pair of fluid pumps 18 and 20 respectively and a fluid motor 22.

The housing 16 has an end 24 suitably secured to a radial flange 26 of the shaft 14 and a hub end 28 axially removed from end 24 and supporting in cooperation with shaft 12 a fluid seal 30 adapted to completely seal the pumps and motor in fluid relation within the housing.

The shaft 12 is supported upon a sleeve bearing 32 mounted upon hub 28 of housing 16 and includes an axial portion 34 extending into the housing and a radial portion 36. The axial and radial portions 34 and 36 of the shaft 12 have therein communicating passages 38 and 40 the latter communicating with reservoir 16 and being controlled as by centrifugally actuated valves 42, the purpose of which will hereinafter appear.

The pump 18 comprises a rotor 44 splined on the axial portion 34 of shaft 12 and a housing 46 supported in bearing relation on axial hub extensions of rotor 44. The peripheral surface of the rotor 44 is of elliptical shape and is adapted to be engageable with radially movable vanes 48 mounted in inwardly spring tensioned relation upon an annular ring portion 50 of housing 46.

The pump housing 46 comprises a ring portion 50, an end cover member 52 axially arranged on one side of rotor 44 and another end cover member 54 arranged on the other side of rotor 44 oppositely disposed from member 52. The member 52 has an inlet port 56 for the pump 18 communicating with passages 58 in rotor 44 connecting the inlet port with the pumping chamber 60 of the pump and controlled as by a one-way valve check 62.

The member 54 includes a pair of axial hub sections 64 and 66 and the hub 64 has therein discharge ports 28 for pump 18 communicating with pumping chamber 60 by way of outlet passages 70 arranged in the rotor of the pump. The hub 66 has extended axially therethrough communicating fluid passages 72 and 74 controlled as by a spring pressed pressure responsive valve 76, the purpose of which will hereinafter appear.

The member 54 provides in conjunction with the end of the axial portion 34 of shaft 12 a fluid channel or chamber 78 serving as an intercommunication between ports 68 and also passages 38 and passages 72.

Pump 18 is of the balanced type providing separated pumping sections such that the inlet and outlet passages 58 and 70 in rotor 44 are arranged as pairs associated with each pumping section.

Pump 20 is of similar structure as that of pump 18 but for the fact that it is of larger capacity than pump 18 and as shown by Fig. 1 is of one and one half effective operating capacity and volumetric displacement thereto.

Rotor 80 of pump 20 is of elliptical shape and is splined on hub section 66 of housing 46 for rotation therewith and provides therein pairs of fluid inlet and outlet passages 82 and 84.

Housing 86 of pump 20 includes a ring section 88, and end cover members 90 and 92 respectively supported for rotation on axial extensions of the rotor 80.

Ring section 88 has mounted therein a plurality of radially inwardly extending spring pressed blades 94 adapted to cooperate with rotor 80 in a pumping cycle of the pump. The end member 90 has an inlet port 96 communicating with pumping chamber 98 of pump 20 by way of inlet passages 82 and the port 96 is controlled as by a one way check valve 99.

End cover member 92 has therein outlet ports 100 in a hub section 102 thereof in communication with pumping chamber 98 by way of outlet passages 84 in rotor 80 and with passage 74 in member 54 by way of fluid channel or chamber 103.

Fluid channel 103 also communicates with passages 104, provided in another hub section 106 of member 92, which in turn communicates with passage 108 also in hub section 106 and controlled as by a pressure responsive valve 110.

The fluid motor 22 although of similar construction to pumps 18 and 20 differs in capacity thereto and as shown in Fig. 1 of the drawings is of triple effective operating capacity and volumetric displacement to that of pump 18.

Motor 22 comprises a rotor or reaction member 112 splined on hub 106 of member 92 for rotation therewith and a housing 114 cooperatively arranged thereon.

The rotor 112 is elliptical as are rotors 44 and 80 of pumps 18 and 20 and has pairs of fluid inlet and outlet passages 116 and 118 respectively. The rotor has a pair of axial hub extensions 120 and 122, hub extension 122 of which is journalled internally of flange 26 of shaft 14.

Housing 114 comprises an annular ring section 124, and an end cover member 126 and utilizes as the other end cover member thereof radial flange 26 of shaft 14.

The ring 124 has mounted therein radially inwardly extending spring pressed blades 128 adapted to cooperate with the peripheral surface of rotor 112.

Cover member 126 has therein an outlet port 130 providing communication between the housing reservoir and the motor chamber 132 by way of outlet passages 118 and flange 26 has therein inlet ports 134 communicating with the inlet passages in the rotor with passage 108 in hub section 106 of member 92 by way of a fluid channel or chamber 136 formed by shaft 14 in conjunction with the end of hub section 106.

Suitable packing seals 138 are provided at the ends of rotors 44, 80 and 112 between their hubs and the members upon which they are spliced to inhibit passage of fluid therebetween.

As a requisite to the proper and effective operation of the transmission and the component parts thereof, the housing 16 serving as the fluid reservoir for the transmission must be substantially filled with a suitable hydraulic fluid at all times.

The proportionate effectively operating capacities of the pumps and motor are to be predetermined in accordance with speed ratio requirements.

The fluid pressure side of valves 76 and 108 are suitably tapered at 140 so as to present surfaces against which the fluid under pressure can act to so move the valves from their seats.

Suitable relief passages, not shown, may be provided along the sides of the vanes so as to inhibit the entrapment of fluid on the tension end thereof.

Fig. 2, although defined with relation to pump 18, is deemed to suffice as a structural counterpart of pump 20 and motor 22 as to the general structure thereof.

In a normal operation of transmission 10, shown in Fig. 1, wherein the housing 16 and the pumps and motor are substantially filled with a suitable hydraulic fluid and the input shaft 12 is rotated at a speed comparable to the idling speed of an internal combustion engine, the rotor 44 of pump 18 is also rotated thus affecting a movement of valve 62 off its seat against the resistance of its tensioning means, so as to draw fluid from the reservoir into the pumping chamber 60 through inlet port 56 and inlet passages 58.

Simultaneously with the rotation of rotor 44 the valves 42 are moved radially outward against there tensioning means by centrifugal force occasioned by the rotation of radial portion 36 of shaft 12 thereby permitting of the flow of fluid from the pumping chamber of pump 18 through outlet passages 70, outlet ports 68, channel 78, passage 38, and thence through passages 40 to the reservoir thereby preventing the accumulation of any pressure within pumping chamber 60 of pump 18 with the consequent result that no power is transmitted by pump 18 during this stage of operation.

As the speed of the input shaft is increased, the valves 42 are further radially moved by centrifugal force against their tensioning means until they are seated at their outward limit of movement thus inhibiting the flow of fluid through passages 40 into the reservoir.

With the closing off of passages 40 pressure is developed in pumping chamber 60 of pump 18 with the result that fluid under pressure is delivered through outlet passages 70, outlet ports 68, fluid channel 78, and passages 72 to act upon and cause an opening of valve 76 thereby permitting the passage of the fluid under pressure through passages 74, channel 103, and passages 104 to thus act upon valve 110. The valve 110 is then opened by the fluid under pressure acting thereon similarly to valve 76 so as to permit the flow of fluid under pressure in its course through passage 103, channel 136, inlet ports 134 and inlet passages 116 into motor chamber 132 thereby effecting rotation of the motor housing 114 and output shaft 14 associated therewith at a speed ratio proportionate to the effective operating capacities or volumetric displacement of the pump 18 and motor 22, which in the structure shown is three to one. The valves 76 and 110 will remain open so long as the torque demand placed upon the output shaft 14 requires the three to one driving ratio. After the passage of the fluid through motor 22 for the rotation thereof, it is discharged through outlet passages 118 and outlet port 130 into reservoir housing 16.

With a reduction in torque demand placed upon output shaft 14 below that required for a three to one ratio drive as predeterminedly established between pump 18 and motor 22, a drop in pressure produced on the fluid by pump 18 occurs resulting in valve 76 moving to its closed position against the resistance of the pumping action of pump 18. As valve 76 closes, a hydromechanical lock-up condition is affected between the rotor 44 and housing 46 thereby causing a rotation of housing 46 at the input speed of shaft 12.

Simultaneously with the lock-up of rotor 44 and housing 46 and in view of the splined relation of rotor 80 upon hub section 66 of housing 46, rotor 80 is driven at the speed of shaft 12 such as to initiate a pumping cycle of pump 20.

As rotor 80 is rotated upon the continued rotation of shaft 12 above idling speeds and wherein the torque demand placed upon the transmission 10 is in the range of two to one, fluid is drawn into pumping chamber 98 of pump 20 through inlet port 96 past valve 99 therein and inlet passages 82 from reservoir housing 16. The fluid under pressure from pump 20 is discharged through outlet passages 84, and outlet ports 100, thence through channel 103 and passages 104 past valve 110 which remains open under the influence of pressure on the fluid produced by pump 20, through passage 108, thence through channel 136, inlet ports 134 and inlet passages 116 into motor chamber 132 for the driving of housing 114 of the motor and the output shaft 14 attached thereto at a two to one ratio with the input shaft 12.

The output shaft 14 will continue to operate at a two to one ratio to the input shaft as predetermined by the effective pumping area and volumetric displacement of pump 20 to motor 22 as long as the torque demand remains at or near two to one.

Assuming as the input shaft is continued in rotation above idling speed and the torque demand upon the transmission and output shaft 14 particularly falls materially below the requirements for a two to one driving ratio of the input to the output shaft, the development of pressure on the fluid in pump 20 will drop causing a closing of valve 110 and check valve 99 thereby affecting a hydro-mechanical lock-up of rotor 80 with housing 86 for rotation therewith. With the continued lock-up of rotor 44 to housing 46 of pump 18 and the subsequent lock-up of rotor 80 to housing 86 of pump 20 as herein occurs, the speed of rotation of shaft 12 is transmitted directly to housing 86 of pump 20.

Because of the splined relation of rotor 112 to hub section 106 of housing 86 the rotor or reaction member 112 is also driven at the rate of rotation of input shaft 12 and in view of liquid being trapped or locked between the vanes or blades of the motor, no pumping action can occur between the rotor 112 and housing 114 thereby causing a hydro-mechanical lock-up of said rotor and housing for a non-slip drive between. At this point of operation of the transmission the input speed of shaft 12 is directly hydro-mechanically transmitted to shaft 14 without any slip therebetween with the result that there are no moving parts in the transmission and no fluid is flowing in the reservoir.

Although the pumps bear a specific variable drive ratio to the motor, the transition stages of operation from 3 to 1 ratio to direct drive occurs with a minimum of noticeable step change because of the cushioning action of the fluid between the power transmitting elements of the drive.

It is to be realized that throughout the ratio speed stages of operation of the transmission that the housing fluid seal 30 is subjected solely to low pressure on the fluid in the reservoir; whereas at one to one or complete lock-up driving between the shafts 12 and 14, no pressure is exerted on the seal thereby permitting an effective sealing of the fluid within the housing under all operating conditions of the transmission. This completes a variable decreasing torque operation of the tranmission.

The operation of transmission 10 in a reverse cycle of torque demand to that hereinbefore recited occurs similarly and equally as smoothly in passing from one stage to another in the variable ratio operation of the transmission between the input and output shafts thereof.

Figs. 3 through 5 illustrate a modified form of automatic variable ratio transmission from that shown by Figs. 1 and 2 wherein one pump is provided in lieu of the two pumps in the structure of transmission 10.

With reference to Fig. 3, 200 represents generally an automatic transmission comprising a power driven input shaft 202 and a power output shaft 204 having arranged therebetween hydro-mechanical coupling means 206 comprising a dual stage volumetric displacement capacity fluid pump 208, a fluid motor 210 and a reservoir housing 212.

The housing 212 is arranged between the shafts and has one end 214 securely fastened to a radial flange 216 forming a part of shaft 204 and a hub portion 218 axially disposed from end 214 and supporting in axial relation with shaft 202 a fluid seal 220. The housing 212 serves as a reservoir for the pumping system of the pump and motor and completely encloses the pump and motor therewithin.

The shaft 202 is journalled upon a sleeve bearing 222 mounted on hub 218 of the housing and has an axial portion 224 thereof extending into the housing and is provided with intercommunicating passages 226, 228, and 230 therein, the purpose of which will hereinafter appear.

The pump 208 comprises a rotor 232 splined upon axial portion 224 of shaft 202 for rotation therewith and a housing 234 mounting in encompassing relation thereto.

The rotor 232 is elliptical in shape so as to provide balanced pumping action with relation to the housing 234 and provides therein a pair of fluid inlet passages 236, and two sets of pairs of outlet passages 238 and 240, the passages 238 of which communicate with passages 226 in shaft 202.

The shaft 202 also has arranged in securely fastened radial extending position thereon an annular member 242 having passages 244 extending radially therethrough providing communication between the passages 230 in shaft 202 with the reservoir in housing 212 controlled as by centrifugally actuated valves 246.

The housing 234 comprises an annular ring portion 248 having a plurality of radially inwardly extending vanes 250 mounted therein adapted to cooperate with the peripheral surface of the rotor 232 for pressure development in pumping chamber 252 of pump 208 during the operation thereof, an end cover member 254 securely fastened to one side thereof and another end cover member 256 securely fastened to the other side of ring 248 oppositely disposed from cover member 254.

The cover member 254 has therein an outlet passage 258 providing communication between the outlet passages 240 in rotor 232 with the reservoir controlled as by a spring pressed responsive valve 260 arranged therein.

The cover member 256 has a radial portion 262 and double diametral hub having a long section 264 and a relatively short section having therein intercommunicating passages 268 and 270 controlled as by a spring pressed responsive valve 272 arranged therebetween and radial portion 262 provides fluid inlet port 273 providing communication by way of inlet passages 236 between the reservoir and pumping chamber 252 of the pump controlled as by a one way check valve 274.

Through a predetermined arrangement of the outlet passages 238 and 240 relative to one another and to the inlet passages 236 and the established pressure at which valve 260 is set to open, a dual stage effective operating capacity pump is provided thereby providing variable ratio power transmission between the input and output shafts of the transmission in accordance with torque demand placed upon shaft 204; that is when a demand for maximum torque is placed on the transmission and the input speed of shaft 202 is above idling, a high pressure is created on the fluid in the pump chamber acting to overcome valve 260 such that only a predetermined partial capacity of the pump is effective for the delivery of pressure fluid to drive the motor. Subsequently as the torque demand diminishes and the pressure on the fluid delivered by the pump falls, the pump is totally effective for the delivery of fluid to the motor thereby producing the reduced ratio or second stage of operation of the pump relative to the motor.

The motor 210 comprises a rotor or reactive member 276 splined to hub section 266 of member 256 for rotation therewith and a housing 284 secured to shaft 204 and utilizing as an end cover member thereof flange 216.

The rotor 276 is of elliptical balanced pumping shape as rotor 232 of pump 208 and provides therein a pair of fluid inlet passages 280 and a pair of fluid outlet passages 282.

The housing 284 in addition to flange 216 of shaft 204 comprises an annular ring member 278 secured to the shaft 204 providing in conjunction with the rotor 276 a motor chamber 286 and has radially inwardly mounted thereon movable blades adapted to cooperate with the peripheral surface of rotor 276 and an end cover member 288 secured upon ring 278 having a fluid outlet port 290 providing communication between the outlet passages in the rotor 276 with the reservoir.

The flange 216 of shaft 204 provides therein a plurality of fluid inlet ports 292 for the motor providing communication between passage 270 and the inlet passages 280 in rotor 276 and has arranged therebetween with hub section 266 of member 256 a spring clutch 294 controlled as by a spring pressed pressure responsive plunger 296 arranged in fluid communication relation to the ports 292, the purpose of which will hereinafter appear.

The operation of transmission 200 is similar in all principal respects to transmission 10 but for the omission of one of the pumps provided in transmission 10 and the utilization of one pump 208 with suitable valvular control to serve the function of two different effective operating capacity and volumetric displacement pumps.

Transmission 200 further differs from transmission 10 in the addition of spring clutch means 294 therein effective upon the release of acceleration and a consequent loss of reactive pressure upon plunger 296 to act upon one end of clutch 294 to retain housing 284 and shaft 202 in locked-up relation so as to inhibit any possible over-running of shaft 204 relative to shaft 202. In this manner clutch spring 294 serves the function of a one-way clutch mechanism.

Although the structural component parts of the before described transmissions are illustrated with reference to specific forms of structure the invention is to be limited only as recited by the appended claims.

What I claim is:

1. A variable ratio transmission comprising a drive shaft, a driven shaft and hydro-mechanical couplings between the shafts including a fluid pump having a rotor secured to the drive shaft and a rotatable casing therefor, means carried by the drive shaft for control of fluid flow to the pump, and a fluid motor having a reaction member connected to the rotatable casing of the pump and a rotatable housing therefor connected to the driven shaft and means carried by the pump casing for control of fluid flow through the motor.

2. A variable ratio transmission comprising a drive shaft, a driven shaft and hydro-mechanical couplings between the shafts including a fluid pump having a rotor connected directly to the drive shaft and a rotatable housing therefor, a valve carried by the drive shaft and actuated by the speed thereof for control of the flow of fluid to the pump, and a fluid motor having a reaction member connected directly to the rotatable housing of the pump and a rotatable housing for the reaction member connected directly to the driven shaft and a fluid pressure actuated valve carried by the rotatable housing of the pump for control of the flow of fluid from the pump to the motor.

3. An automatic transmission comprising a drive shaft, a driven shaft, a fluid pump comprising a rotor and a housing, the rotor thereof being connected to the drive shaft, a second fluid pump of greater effective operating capacity than the first pump, comprising a rotor and housing, the rotor thereof being connected to the housing of the first pump, a fluid motor of greater effective operating capacity than either of the pumps, comprising a reaction member connected to the housing of the second pump and a housing connected to the driven shaft, the discharge of said pumps being in communication with one another and with the intake to the motor and the discharge of the motor having communication with the intake of the pumps, one way check valves controlling the respective intake to the pumps, and pressure responsive valves respectively in the discharge of the pumps for controlling the flow of fluid between the pumps and motor.

4. An automatic transmission comprising a drive shaft, a driven shaft, and means coupling the shafts together comprising a fluid pump having a rotor connected to the drive shaft and a housing, a second fluid pump of greater effective capacity than the first pump having a rotor connected to the housing of the first pump, and a housing, a fluid motor of greater effective operating capacity than either of the pumps having a reaction member connected to the housing of the second pump and a housing connected to the driven shaft, a substantially fluid filled housing enclosing the pumps and motor, the fluid outlet of both pumps having communication with each other and the fluid inlet to the motor and the fluid inlet of both pumps and fluid outlet of the motor having communication with the fluid filled housing and a one way check valve in each of the fluid inlets of the respective pumps, and a pair of valves in series respectively at the outlet from the pumps for controlling the flow of fluid from the pumps to the motor for the selective operation thereof and effective to provide for a hydro-mechanical lock-up between the pumps and also between the pumps and motor in accordance with torque demand placed on the driven shaft.

5. An automatic transmission comprising a drive shaft, a driven shaft, and means coupling the shafts together comprising a fluid pump having a rotor connected to the drive shaft and a housing, a second fluid pump of greater effective capacity than the first pump having a rotor connected to the housing of the first pump and a housing, a fluid motor of greater effective operating capacity than either of the pumps having a reaction member connected to the housing of the second pump, and a housing connected to the driven shaft, a substantially fluid filled housing enclosing the pumps and motor, the fluid outlet of both pumps having communication with each other and the fluid inlet to the motor and the fluid inlet of both pumps and fluid outlet to the motor having communication with the fluid filled housing, a one way check valve in each of the fluid inlets of the respective pumps, a pair of valves in series respectively at the outlet from the pumps for controlling the flow of fluid from the pumps to the motor for the selective operation thereof and effective to provide for hydromechanical lock-up between the pumps and also between the pumps and motor in accordance with torque demand placed on the driven shaft, and a centrifugally acuated valve controlled passage in the rotor communicating with the fluid outlet from the first pump.

6. A variable ratio transmission comprising a drive shaft, a driven shaft and hydro-mechanical means between the shafts, including, a fluid pump having a rotor connected to the drive shaft and a rotatable housing therefor, and a motor having a reaction member connected to the housing of the pump, and a rotatable housing for the reaction member connected to the driven shaft, a fluid circuit for the pump and motor, a valve carried by the drive shaft and connected in the fluid circuit for control of fluid flow to the pump, a pressure responsive valve carried by the housing of the pump and connected in the fluid circuit for regulating the capacity of the pump, and a second pressure responsive valve carried by the pump housing, and connected in the fluid circuit between the output of the pump and intake of the motor.

7. A transmission comprising a drive shaft, a driven shaft, a fluid pump comprising a rotor and a housing, the rotor of which is directly connected to the drive shaft, a fluid motor adapted to receive the discharge from the pump comprising a reaction member connected to the housing of the pump and a housing connected to the driven shaft, a centrifugally actuated valve carried by the drive shaft for control of the flow of fluid to the pump, a pressure responsive valve intermediate the discharge of the pump and inlet to the motor for control of the flow of fluid therebetween, and means providing communication between the motor discharge and pump inlet.

8. A transmission comprising a drive shaft, a driven shaft, and fluid couplings between the shafts including a pump having a rotor fixedly secured to the drive shaft, and a rotatable housing therefor having a hub journaled on the drive and driven shafts, a fluid motor having a reaction member fixedly secured to the hub and a rotatable housing therefor fixedly secured to the driven shaft, a fluid circuit for the pump and motor, a centrifugally actuated valve carried by the drive shaft and connected in the circuit for control of fluid flow to the pump, a pressure responsive valve supported in the hub and connected in the circuit for control of fluid flow between the pump and the motor, and a clutch mechanism between the hub and the output shaft.

9. A transmission comprising a drive shaft, a driven shaft and fluid couplings connecting the shafts including, a pump having a rotor fixedly secured to the drive shaft and a rotatable housing journaled on the shafts, and a fluid motor having a reaction member fixedly secured to the housing of the pump and a rotatable housing for the reaction member journaled on the housing of the pump and fixedly secured to the driven shaft, a fluid circuit for the pump and motor, a valve carried by the drive shaft and connected in the circuit for control of fluid flow to the pump, a fluid pressure actuated valve carried by the pump and connected in the circuit for control of fluid flow between the pump and the motor and a fluid pressure actuated clutch connected in the circuit and effective to couple the housing of the pump with the driven shaft.

DON E. DASHER.

References Cited in the file of this patent

UNITED STATES PATENTS

| Number | Name | Date |
|---|---|---|
| 932,033 | Krone | Aug. 24, 1909 |
| 1,203,745 | Kilgore | Nov. 7, 1916 |
| 1,545,678 | Miller | July 14, 1925 |
| 1,816,735 | Magness et al. | July 28, 1931 |
| 2,074,618 | Roeder | Mar. 23, 1937 |
| 2,447,348 | Kucher | Aug. 17, 1948 |

FOREIGN PATENTS

| Number | Country | Date |
|---|---|---|
| 221,190 | Great Britain | Feb. 19, 1925 |